US005638600A

United States Patent [19]

[11] Patent Number: 5,638,600

[45] Date of Patent: Jun. 17, 1997

Rao et al.

[54] METHOD OF MAKING AN EFFICIENCY ENHANCED FLUID PUMP OR COMPRESSOR

[75] Inventors: V. Durga Nageswar Rao, Bloomfield Township; Carlo Alberto Fucinari, Farmington Hills, both of Mich.

[73] Assignee: Ford Motor Company, Dearborn, Mich.

[21] Appl. No.: 633,273

[22] Filed: Apr. 16, 1996

Related U.S. Application Data

[62] Division of Ser. No. 319,909, Oct. 7, 1994, Pat. No. 5,554, 020.

[51] Int. Cl.[6] .......... B23P 15/00

[52] U.S. Cl. .......... 29/888.02; 29/888.023

[58] Field of Search .......... 29/888.02, 888.023, 29/888.022, 888.024, 888.025, 527.4, 527.2; 418/178, 179; 428/416, 458, 411.1

[56] References Cited

U.S. PATENT DOCUMENTS

| | | | |
|---|---|---|---|
| 4,037,522 | 7/1977 | Inoshita et al. . | |
| 4,285,640 | 8/1981 | Mukai . | |
| 4,307,998 | 12/1981 | Nakayama et al. . | |
| 4,551,395 | 11/1985 | Lloyd . | |
| 4,568,252 | 2/1986 | Hattori et al. . | |
| 4,662,267 | 5/1987 | Kaku et al. . | |
| 4,682,938 | 7/1987 | Riorda | 29/888.23 |
| 4,797,011 | 1/1989 | Saeki et al. . | |
| 4,927,715 | 5/1990 | Mori . | |
| 5,066,205 | 11/1991 | Ingalls | 29/888.023 |
| 5,377,407 | 1/1995 | Takahashi et al. | 29/888.023 |

FOREIGN PATENT DOCUMENTS

| | | |
|---|---|---|
| 54-24304 | of 1979 | Japan . |
| 59-221749 | of 1984 | Japan . |

*Primary Examiner*—Irene Cuda
*Attorney, Agent, or Firm*—Joseph W. Malleck

[57] ABSTRACT

A high efficiency pump having relatively-moving parts constituted of a light weight material and a coating on at least one of the parts to effect essentially zero clearance between the parts where they merge together. The coating is comprised of solid lubricants in a polymer resin matrix stable up to 700° F.

3 Claims, 3 Drawing Sheets

METHOD OF MAKING AN EFFICIENCY ENHANCED FLUID PUMP OR COMPRESSOR

This is a divisional of application Ser. No. 08/319,909 filed Oct. 7, 1994, now U.S. Pat. No. 5,554/

BACKGROUND OF THE INVENTION

1. Technical Field

This invention relates to modification of pump designs for transferring liquids and to modification of compressor designs for transferring gases (the transferred fluid being in shear), to increase efficiency and reliability of the fluid transfer.

2. Discussion of the Prior Art

The state of the prior art for design of pumps and compressors have attained only limited efficiencies. Efficiency is usually defined to mean the ratio of the amount of energy stored in the pumped fluid to the energy put into the pump. Indicators of high efficiencies not only are less leakage, but higher output density and pressure. Gas fluid pumps, such as automotive turbochargers, have an efficiency typically of 50–60%, liquid pumps typically of 70–85% and some special automotive oil pumps of up to 90%. The limited efficiency of the prior art is indicative of leakage; an ideal pump or compressor would allow no leakage between the relatively moving parts therein which do the pumping. In addition, affinity or adhesion of the fluid to the pumping surfaces causes shear losses which result in heating of the fluid.

State of the art pumps or compressors incorporate a certain degree of intentional looseness between the relatively moving parts, such as a rotor and housing, to accommodate differential thermal expansion of the parts and to reduce the losses due to shear since the shear losses increase as the viscous film thickness decreases. Such expansion will (i) cause rubbing or mechanical contact (ii) increase friction between such parts, and (iii) increase friction as a result of surface viscous friction that arises between the moving parts due to fluid shear, if not alleviated by designed looseness. Such designed looseness thus limits efficiency.

There also exists in the prior art an inability to use lighter weight, lower strength metal materials (i.e. aluminum) for the compressor designs which experience high unit fluid loadings. Such loadings can distort such lower strength metals which thereby tend to exaggerate leakage or increase friction resulting in additional poor efficiency.

SUMMARY OF THE INVENTION

It is an object of this invention to provide a fluid pumping apparatus that has relatively-moving internal parts constituted of a light weight material, such as aluminum or magnesium, to promote less mass particularly for automotive vehicle applications, while at the same time enhancing pumping efficiency with essentially zero fluid leakage.

In a first aspect, the invention is a high efficiency fluid pump for compressing gases or pumping liquids, the apparatus comprising (a) means for effecting a pumping action by use of relatively movable parts which cyclically move together and move apart at a zone to transfer fluid, the parts being constituted of a light weight material selected from the group consisting of aluminum, magnesium, titanium, copper, bronze, ceramics, such as silicon nitride, cordierire (magnesium aluminum silicate), (b) a coating on at least one of the parts in sufficient thickness to provide essentially zero clearance when said parts have moved together at said zone, the coating comprising solid lubricants in a polymer resin matrix stable up to 700° F. In case of ceramic parts, a thicker coating is applied on a rough machined or as-molded surface and finished by a standard grinding operation. This facilitates very rapid sizing at a substantial savings in process cost, relative to uncoated ceramic parts.

The invention, in another aspect, is a method of making a high efficiency fluid pumping apparatus for gas compressors or liquid transfer, comprising: (a) forming aluminum based relatively movable parts that entrain and effect a pumping action of a fluid, the parts having surfaces that cyclically merge together and move apart to transfer fluid by placing a shear load on such surfaces; (b) machining said surfaces to a finish of 100–150 microns per inch; (c) preparing said rough-machined surfaces by etching or phosphating to effect a dimpled texture; (d) depositing a thin coating on the prepared surface by spraying or rolling, the coating consisting of a mixture of solid lubricant particles and heat curable resin that attracts gas or liquid molecules and is stable up to a temperature of 700° F., the solid lubricant particles having an average particle size within the range of 0.5 to 10 microns, the coating being deposited in a thickness to create a slight interference at said zones; (e) slowly heating the deposited coating to a temperature of about 200° F. and holding said temperature for at least fifteen minutes followed by additional 15 minutes at 375°–400° F.; and (f) after returning the temperature of the coating to room temperature, operating said pump to abrade said coated surfaces to essentially a zero clearance between said relatively moving parts.

An advantage of this invention is an enhancement of pumping efficiency by 5–11% and an increase in pumped volume (density and pressure).

DETAILED DESCRIPTION AND BEST MODE

This invention applies a low friction, wear resistant solid film lubricant coating (which coating is compatible with and has affinity for conventional liquid lubricants such as lubricating oil) to at least critical, if not all, the potential rubbing and wearing surfaces of internal components of the apparatus, namely the rotor housing, the rotor, gear and scroll surfaces in the case of generator type oil pump, vanes in the case of vane type oil pumps, and swash plates and pistons in the case of swash plate type oil pumps. These devices have typically been constructed of cast iron or steel with some recent designs using forged or precision die cast high strength aluminum alloy. Unfortunately, when these pump designs are used for motor vehicle applications such as for pumping oil or transmission fluid, or air in the case of superchargers, the pumping efficiency limits the ability of such pumps to provide proper oil (or fluid) flow rates without enlarging the size of the pump beyond that tolerated by the weight and design specifications for automotive pumps. Increasing the pump size is undesirable from the viewpoint not only of packaging within a very crowded vehicle envelope but the added weight, as a result of the increased pump size, partially negates the weight advantage of the device to reduce fuel consumption and emissions for the vehicle. By replacing the cast iron or hardened steel components with forged high strength 390 aluminum alloy components, a weight reduction in the oil pump mass is achieved. But in the past such substitution of aluminum has not been deemed successful because of high wear rates and lack of durability and interference from thermal expansion.

Figure 1:
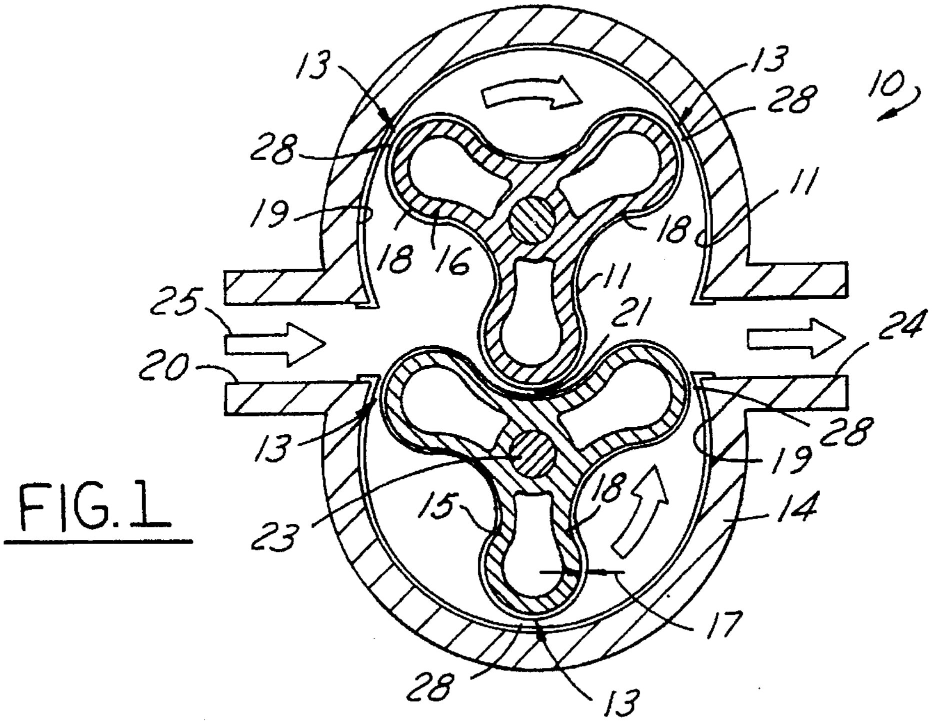
FIG. 1 is a central sectional view of a lobed compressor employing the principles of this invention.
Figure 2:
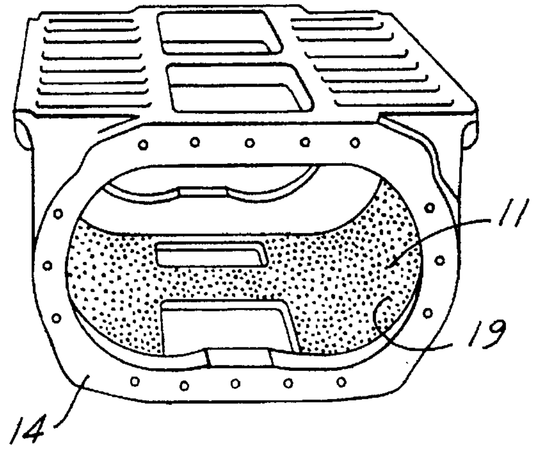
FIG. 2 is a perspective view of the housing for the apparatus of FIG. 1.
Figure 3:
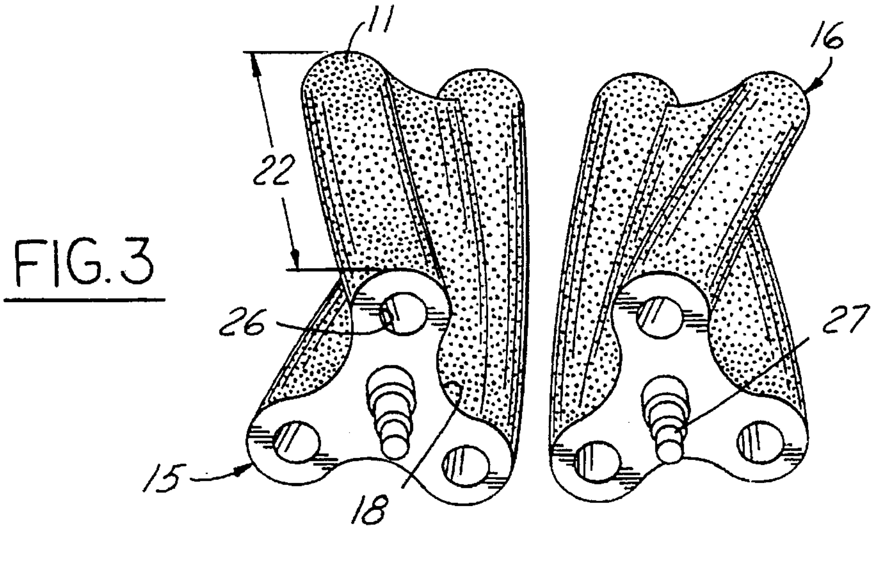
FIG. 3 is a perspective view of the lobe rotors for the apparatus of FIG. 1, the rotors being separated for convenience of illustration.

FIG. 1, illustrates for a typical gas compressor 10 used for engine super-charging. A low friction, wear resistant solid film lubricant coating 11, which is compatible with and has affinity for conventional liquid engine lubricants (or can promote gas squeeze film lubrication with close gap control), is applied to at least surfaces 12 that cyclically merge together and move apart at a zone 13 to transfer fluid that places a shear load on such surfaces; such coating is thus applied to at least critical if not all the potential rubbing and wearing surfaces of the supercharger compressor components, namely the rotor housing 14 and rotor 15,16 as relatively-moving parts. Such relatively-moving parts 14,15, 16 are constructed here of precision die cast high strength aluminum alloy.

The coating 11 is deposited in a controlled thickness 17 of approximately 0.5 mm, to promote an initially interfering fit which abrades to a substantially zero clearance upon start up of the pump. In pumps that involve fluid shear and compression, it is advantageous to use a casting that is actually fluid phobic (i.e. tungsten disulphide in teflon or in a thermoset polymer). With a fluid phobic coating, zero clearance operation, without friction between rotors, is achieved with minimum shear and related heating of the fluid. The coating system is accompanied by the use of an aluminum alloy substrate (such as 390 alloy) to reduce the weight of the compressor, increase its output, significantly increase its durability and life, and increase efficiency while reducing power consumed driving the compressor. These advantages can be attributed to: (a) selection of the chemistry of the coating to have affinity for the fluid being pumped to rapidly create and stabilize a gas film formation to reduce power consumption (it should be noted that gas squeeze film provides significantly lower friction as compared to the conventional high viscosity lubricants); (b) the coating chemistry provides extremely low friction even under dry boundary lubrication conditions, for essentially zero clearance operation (clearances represent a significant loss in output or an increase in power consumption); (c) the unique frictional characteristics of the coating involves a rapid reduction of the friction co-efficient as temperature is raised, not only permitting but cooperating with the use of lightweight aluminum alloy components which otherwise would scuff and seize under near zero clearance operation; and (d) the coating eliminates the necessity for clearances required to overcome prior thermal expansion differences between the housing and rotors to avoid seizing, which has resulted in loss of performance by leakage. Because the aluminum alloy will have greater thermal conductivity, the apparatus of the newly designed compressor can be combined with internal cooling to permit heat removal from the incoming charge thereby increasing the charge density. This is beneficial because its allows the compression ratio in gasoline engines to increase with an intended increase in engine power output and fuel economy.

Returning to FIG. 1, the compressor 10 is used for boosting the charge (air/fuel mixture or air, in the case of fuel injection engines) density. The rotors 15,16 and the stator 14 (rotor housing) have the low friction coating 11 deposited along the outer surfaces 18 of the scrolled rotors and along the internal surfaces 19 of the contoured housing. Air is drawn in on the intake side 20 of the compressor apparatus and the clearance 21 between the rotors 15,16, is gradually reduced along the length 22 of the rotor from the intake side 20 to the discharge side 24 enabling the compression of the charge 25 therebetween. The rotors 15,16 can have straight or helical lobes; the lobes are usually hollow at 26 to reduce weight.

The rotors are mounted in low friction bearings 27 and are externally driven through a shaft 23. The design of the rotors and the coated clearances 28 (between the coated rotors and the coated rotor housing), the coated clearances 21 (between the coated rotors themselves) and the mounting tolerances define the compression efficiency and power consumption of the supercharger. Heat is removed from the air charge to the supercharger by the increased thermal conductivity of the aluminum components which carry heat away from the incoming charge by the path to the coolant.

The method of making a high efficiency gas compressor or supercharger involves first forming the aluminum-based relatively-movable parts 14,15,16 that entrain and effect a pumping action of the fluid; the parts, of course, have surfaces that cyclically merge together and move apart to transfer the fluid by placing a shear load on the surfaces. The rotor and housing are made with aluminum which is cast or forged to near net shape in size requiring only rough machining to the set tolerances. The rotors and housing, for example, are rough machined and honed to a micro-finish of 10 micro inches or finer; the parts are then degreased with appropriate solvent, grit blasted with clean non-shattering grit (grit blasting improves the adhesion of the coating but in some cases a clean surface without grit blasting has been found to provide adequate bond). Light etching with dilute hydrochloric or nitric acid (HF or $HNO_3$) in the case of a 390 aluminum alloy has also been used by the prior art to fully prepare surfaces for coating. Etching will produce relief surfaces exposing hard silicon particles which provides wear resistance but such etching is not necessary with the coating employed with this invention and thus can be omitted. Also, when the surfaces are rough machined (10–20 microns Ra), a light etch followed by the coating application will also work well.

The coating is advantageously applied by means of either (i) an electrostatic or air atomized spray/or dip process or (ii) a smooth sponge roller. Additionally, the adhesion of such coating can be promoted by use of treatments such as zinc phosphate or a surface preparation described above. Thermal powder spraying is not necessary because the loads are quite low and the coating described can actually wear in to mate with the surfaces to reduce friction and wear as well as reduce leakage and power consumption. The coating formulation is applied on the freshly prepared surfaces. In the case of conventional room temperature spraying process, air atomization can avoid emission of harmful organic solvent vapors into the atmosphere if the formulation is water based. Such water based formulation involves the following: (a)

solid lubricants selected from the group of graphite, $MoS_2$ and BN, with up to 20% such lubricants optionally replaced by LiF, $CaF_2$, $WS_2$, or a eutectic of LiF/$CaF_2$ or LiF/$NaF_2$; (b) a thermoset resin and polymerizing catalyst, and (c) water as an evaporative medium. The thermoset resin can be and epoxy or polyimide, but must possess the characteristic of a high load bearing capability up to 300° F. and affinity for oil. An electrostatic spray process or roller sponge coating process or a pad transfer film process can alternatively be used for the coating application. When a solvent based coating material is used, the chemistry will consist of the aforementioned solid lubricants, a thermoset resin and polymerizing catalyst, and an evaporative solvent for carrying the lubricants and resin.

These processes provide excellent coating thickness control to meet the criteria of this invention which is ±2.5 to 5 micron variation for nominal coating thicknesses of 12.5 to 25 microns. Such thickness, necessitates no subsequent honing or polishing. The coating can be applied in a single layer to obtain the specified thickness in the case of rolling or transfer film process; however, in the case of a spray process, a multi-layer coating on a warm substrate surface is desirable. The particle size of the solid components of the formulations should be selected to be under 10 microns to achieve a smooth surface finish. It is possible to perform a polishing operation although it is not deemed necessary to provide the surface finish in the 4–5 micro-inch range. The coating is cured by slowly heating to 190°–210° F. in about 15 minutes and holding for 15 minutes followed by a second curing operation at about 375° F. In the as deposited form, the thickness of the coating when added to the near net shape dimensions of the rotor and housing will create an interference fit of 0–5 microns. This is adequate for a very rapid break-in and excellent durability without any loss in performance. The coating will abrade the 0–5 microns to create an essentially zero clearance.

In the case of oil pumps, at least the potential rubbing and wearing surfaces of the pump components are coated with the low friction coating to create an interference fit. The components are namely the rotor housing, rotor, scroll surfaces in the case of a generator type oil pump, vanes in the case of a vane type compressor and a swash plate and piston in the case of a rotary oil pump apparatus. The relatively moving parts of the pump are constructed of aluminum based material, preferably a precision die case high strength aluminum alloy. The combination of an aluminum based substrate as well as an interference fit obtained through use of an abradable low friction material enables an engine oil pump design to reduce hydrocarbon emissions and improve knock-limited compression ratio, stabilize the piston crown, and enable higher heat removal rates during all strokes of the piston. The oil pump will not only provide oil lubrication between the sides of the pistons and cylinder bore, but also can splash the underside and interior of the pistons. 0il spray cooling of the piston interior is a very desirable feature. However, the additional oil flow rate needed cannot be achieved with conventional oil pumps on today's market unless the oil pump size is considerably increased. Increasing the oil pump size is undesirable from the standpoint not only of the limited packaging or envelope within the engine compartment, but the added mass is contrary to the needs of increased fuel economy.

The present invention significantly boosts the oil pump output without having to increase the size of the pump. It is important that the interference coating for the oil pump have an affinity for the lubricant fluid so that it can promote a rapid formation of the oil film and stabilize such oil film formation to achieve reduced power consumption. In an oil pump operating cycle, under certain operating conditions, the rubbing surfaces are exposed to a condition that depletes a lubricant oil film. This is especially true under severe starting conditions, which makes the system vulnerable to high wear. The solid film lubricant coating described with this invention, because of its affinity for oil, always maintains an oil film and alleviates this problem and extends the life of the system at least 100%. Because of the extremely low friction, even under dry/boundary lubrication conditions, virtual zero clearance operation is promoted. In fact, the design encourages a small interference fit at assembly. The surfaces wear-in to achieve zero clearance operation avoiding any clearance that produces leakage and a loss in output; the zero clearance operation increases output without incurring power losses.

Figure 4A:
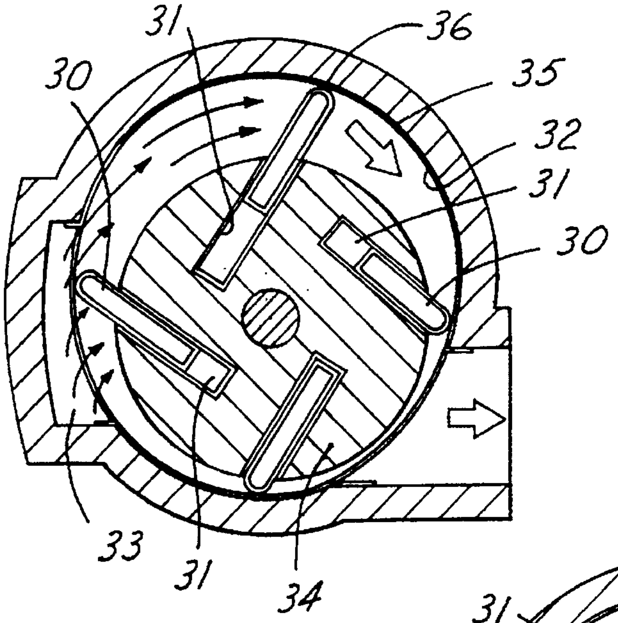
FIGS. 4A and 4B are schematic central sectional views of a vane oil pump embodying the principles of this invention, the views illustrating different stages of the pumping action.
Figure 4B:
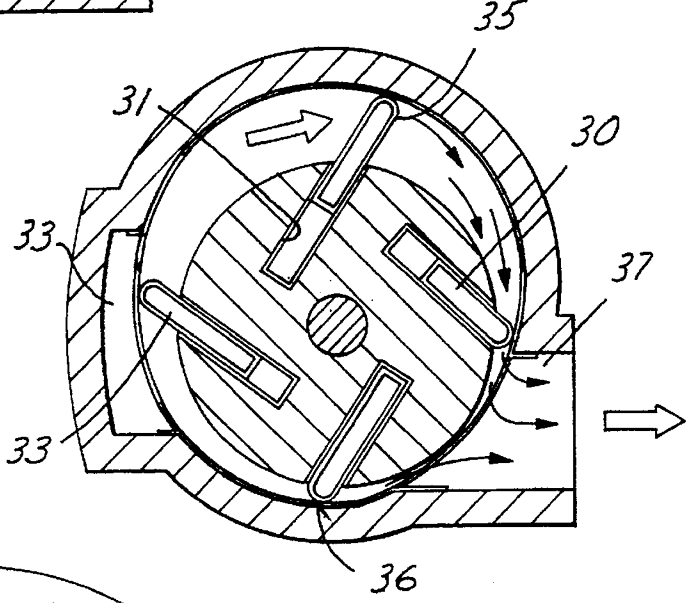
Figure 5:
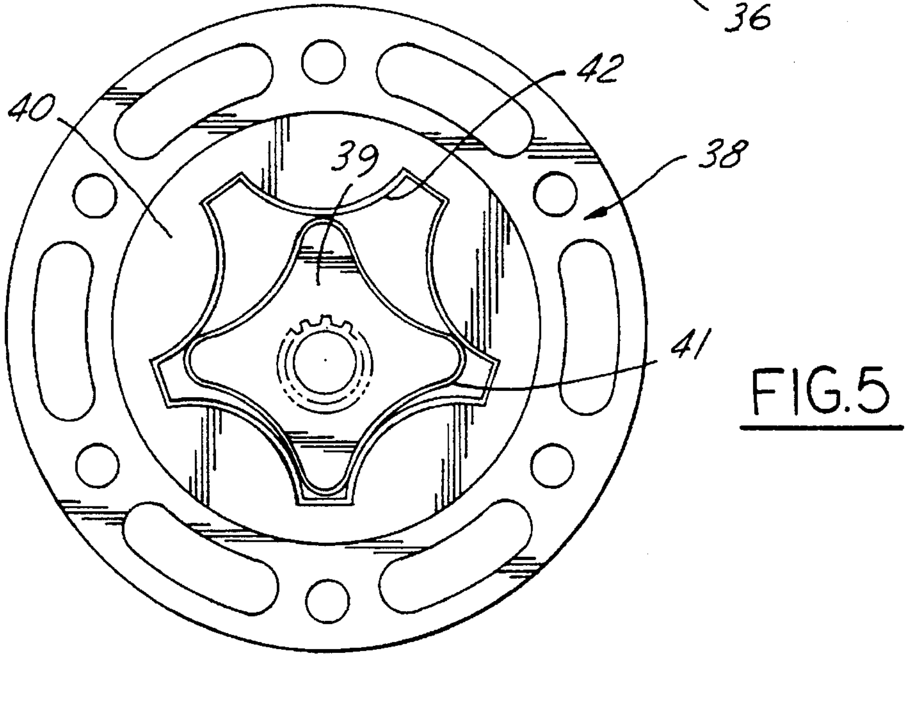
FIGS. 5–7 are schematic sectional views of pumps employing the principles of this invention, FIG. 5 illustrating a schematic sectional view of an internal gear pump, FIG. 6 illustrating a schematic sectional view of an external gear pump, and FIG. 7 illustrating a schematic central sectional view of a Barnes gear pump.

As shown in FIGS. 4A and 4B, the vanes 30 and vane pockets 31 of the rotors and the stator interior surface 32 (rotor housing) are coated with a coating 35 to the thickness of 5–35 microns. Oil is drawn on the intake side 33 and the clearance 36 between the vanes and surface 32 is maintained at essentially zero clearance because the leakage due to the clearance is a loss in output and reduces pump efficiency. Fluid is delivered to the discharge side 37 as pumped by the vanes. The vanes are usually constructed hollow to reduce weight; they are machined and honed to a smooth finish usually 10 micro inches or finer after coating. The rotor 34 is mounted in low friction bearing and is externally driven. In the case of an internal gear type pump 38, shown in FIG. 5, the gear 39 is driven within movable gear 40. The convex lobes surfaces 41 of the gear 39 contact the convex lobes 42 of gear 40. The coating is applied to all such lobed surfaces 41 and 42. The design of the rotors and the assembly clearance is between the rotors and the rotor housing and the rotors themselves in the mounting tolerances define the pump efficiency and the power consumption for the oil pump.

Figure 6:
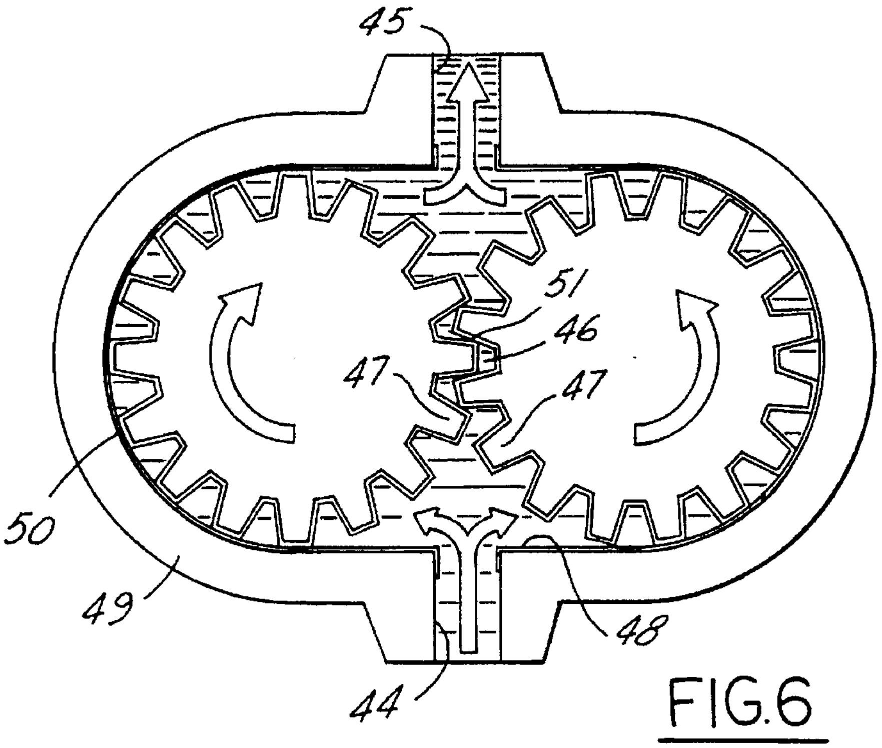

The same coating 11 may be applied to a gear pump as shown in FIG. 6 along the gear teeth 47 and interior surface 48; in this construction, liquid is carried from a suction 44 to a discharge 45 in the spaces 46 between the gear teeth 47 and the surface 48 of the pump casing 49 as the gears rotate. One of the gears is directly driven by the source of power while the other rotates with it, in the opposite direction. This is accomplished either because motion is imparted from the drive gear to the idler gear by the meshing of the two gears at the center of the pump chamber or because timing gears standing outside the pump transmit motion from one gear to the other. There are close clearances at 50 between the gear teeth and the pump casing, as well as at 51 between the teeth of the two gears at their point of contact where they form a continuous fluid tight joint.

As the gears rotate in the direction indicated by the arrows, liquid is trapped in turn between each pair of teeth in the casing and carried away from the intake chamber. At the same time, as teeth unmesh at the center, the space they occupied is empty of liquid. Pressure is therefore lowered in the intake chamber, so that liquid flows into it from the source of supply as the gears rotate. Such rotary gear pumps are of necessity positive displacement since they deliver a definite quantity of liquid for each revolution of movement. As such a gear pump wears, the trapped liquid between the gear teeth may create a major problem since it sets up a strong pressure opposed to the action of the pump intending to spread the gears apart.

Figure 7:
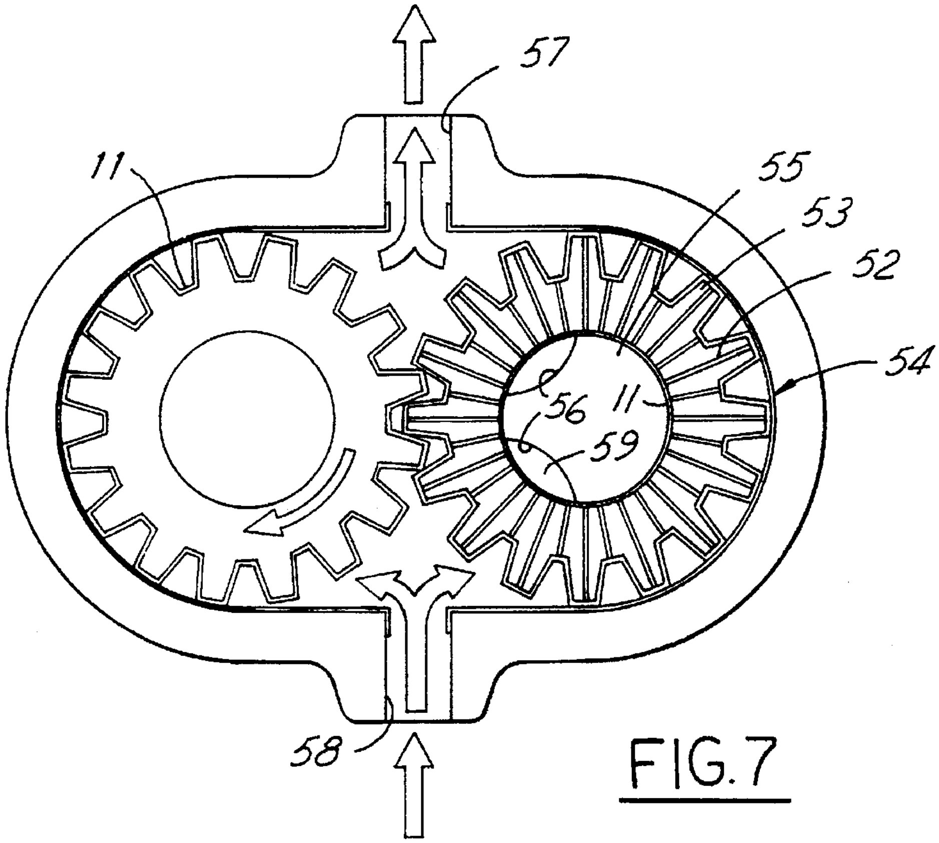

Barnes gear pumps have been utilized as shown in FIG. 7 to overcome such opposing pressure. They are constructed with small passages 52 running through and between the teeth B3 of the driven gear 54. This gear 54 rotates around a stationary shaft 55 having two recesses 56 which are arranged so that the trapped liquid is forced through the passages 52 into the recesses 56 and out into either the discharge 57 or the inlet 58 area. The coating 11 is here applied also to shaft 55 and the interior opening 59 of gear 54. Liquid caught at point A will be driven through one recess in the stationary shaft out into the discharge, while liquid is also free to fill the recess under B and relieve the vacuum that would otherwise form between the gears as they unmesh. The position of the central shaft on these pumps can be adjusted so that some portion of the liquid trapped between the meshing gears will be returned to the inlet area, thus giving variable delivery. Discharge can be reduced by as much as one-third.

We claim:

1. A method of making a high efficiency fluid pumping apparatus for gas compressors or liquid transfer, comprising:

(a) forming aluminum alloy based relativelymovable parts that entrain and effect a pumping action of a fluid, said parts having surfaces that cyclically merge together and move apart to transfer fluid that places a shear load on said surfaces;

(b) rough machining said surfaces to a surface finish of 100–150 micro inches;

(c) preparing said rough machined surface by etching or phosphating;

(d) depositing a coating on said prepared surfaces by one of room temperature spraying, transfer film rolling and thermal spraying, said coating consisting of a mixture of resin and solid lubricant particles, said solid lubricant particles having an average particle size of 10 microns or less, said coating being deposited in a thickness to create a slight interference fit at said zone;

(e) slowly heating said deposited coating to the temperature level of 200° F. and holding said heating for about 15 minutes followed by heating to 375°–400° F. for about 15 minutes; and (f) operating said apparatus to abrade said coating to essentially a zero clearance at said zones.

2. The method as in claim 1, in which said deposited coating is in the thickness range of 2.5 to 25 microns with 0–5 microns of interference fit.

3. The method as in claim 1, in which the solid lubricant particles of said coating absorb gas or liquid molecules, while being stable up to the temperature 700° F., said solid lubricant particles providing a coefficient of friction of no greater than 0.06.

* * * * *